(12) United States Patent
Takeda et al.

(10) Patent No.: US 6,758,209 B2
(45) Date of Patent: Jul. 6, 2004

(54) LIQUID HEATING COOKER

(75) Inventors: Eiichi Takeda, Nagoya (JP); Hideo Chikazawa, Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 0 days.

(21) Appl. No.: 10/324,809

(22) Filed: Dec. 20, 2002

(65) Prior Publication Data

US 2003/0127088 A1 Jul. 10, 2003

(30) Foreign Application Priority Data

Jan. 7, 2002 (JP) ........................................ 2002-000208

(51) Int. Cl.[7] .............................................. A47J 27/026
(52) U.S. Cl. ................................ 126/391.1; 126/373.1; 99/403
(58) Field of Search ........................... 126/391.1, 350.1, 126/345, 346, 373.1, 376.1; 99/403; 431/326, 328

(56) References Cited

U.S. PATENT DOCUMENTS 4,321,857 A * 3/1982 Best ............................ 99/340
4,397,299 A 8/1983 Taylor et al.
4,848,318 A 7/1989 Brewer
4,913,041 A 4/1990 Taber et al.
4,976,609 A 12/1990 Grob et al.
5,101,558 A 4/1992 Grob et al.

\* cited by examiner

Primary Examiner—James C. Yeung
(74) Attorney, Agent, or Firm—Burr & Brown

(57) ABSTRACT

A liquid heating cooker comprises a container having an access portion that is covered by a removable cover. A vat containing a heating medium is positioned within the container, and a combustion burner, provided to heat the medium, is positioned within the container such that a combustion surface of the burner opposes an outer wall surface of the vat. Guide means are also provided for sliding the burner in and out of the container via the access portion, such that the burner is removable and attachable with respect to the container. A combustion chamber is defined by the combustion surface of the burner and the opposing outer wall surface of the vat, and a portion of the burner defines a partitioning wall partitioning the combustion chamber into left and right chambers with respect to the sliding direction of the burner.

8 Claims, 6 Drawing Sheets

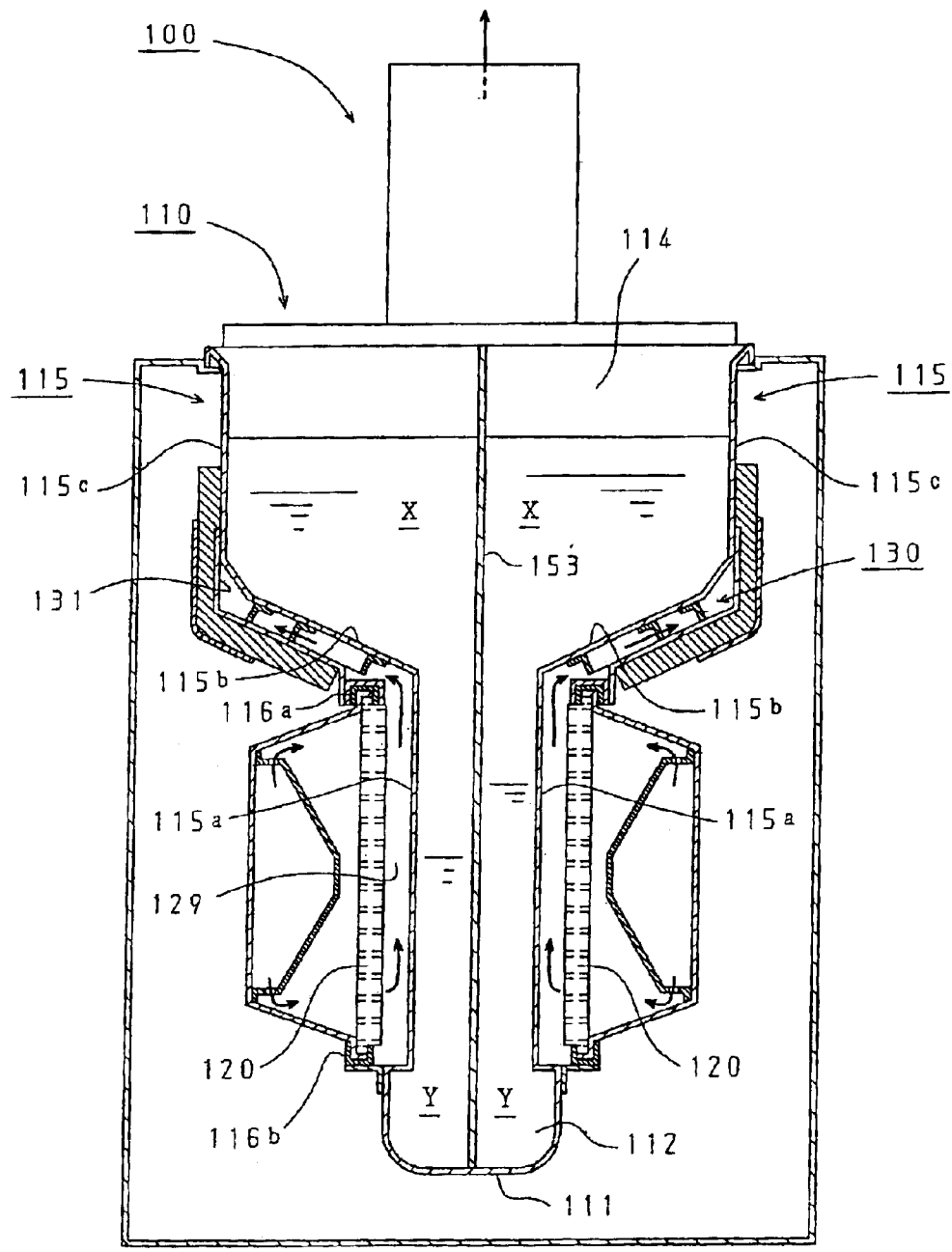
FIG.6 - PRIOR ART
Appendix D

LIQUID HEATING COOKER

This application claims the benefit of Japanese Application 2002-000208, filed Jan. 7, 2002, the entirety of which is incorporated herein by reference.

BACKGROUND OF THE INVENTION

1. Field of the Invention

The present invention relates to liquid heating cookers such as fryers and noodle boilers in which a heating medium such as cooking oil or water that has been filled into a vat is heated by a burner so as to cook foods such as French fries or noodles.

2. Description of the Related Art

A conventional fryer 100 is shown in FIG. 6. The fryer is provided with a vat 110 into which cooking oil for deep frying foods, such as French fries and chicken, is filled, and the cooking oil in the vat is heated from the outside of the vat 110 through the combustion of a burner 120.

Broadly speaking, the vat 110 includes left and right side wall portions 115 that oppose each other, a front wall portion formed vertically (not shown), a rear wall portion 114 in opposition to the front wall portion, and a bottom wall portion 111.

The side wall portions 115 of the vat 110 include an upper side wall portion 115c forming a vertical wall, a middle side wall portion 115b sloping downward from the upper side wall portion 115c, and a lower side wall portion 115a extending vertically from the bottom end of the middle side wall portion 115b. The region enclosed by the upper side wall portion 115c, the middle side wall portion 115b, the front wall portion, and the rear wall portion 114 is a cooking zone X.

A relatively narrow deep well portion 112 is formed in the lower part of the vat 110, surrounded by the left and right lower side wall portions 115a and the bottom wall portion 111, and extending in the depth direction.

A pair of ceramic burners 120 for heating the cooking oil are provided on the left and right lower side wall portions 115a. The region below the burners 120 in the well portion 112 is formed as a cold zone Y that is only slightly heated. The cold zone Y is capable of holding oil sediment generated from the foods during cooking, thereby preventing deterioration of the cooking oil.

Outside panels 131 are provided the outside of the vat 110 to the left and right at a certain distance from the middle side wall portions 115b. The upper part of the outside panels 131 is bent and fixed to the upper side wall portions 115c. An exhaust duct 130 is formed between the outside panels 131 and the middle side wall portions 115b. The exhaust duct 130 conveys combustion gas from the burners 120 to the rear wall portion 114 via the middle side wall portions 115b, and discharges the combustion gas out of the fryer.

The burners 120 are caulked to an upper fixed panel 116a and a lower fixed panel 116b, each having a bracket-shaped cross section. Due to the caulking, a hermetic combustion chamber 129 is formed between the burners 120 and the lower side wall portions 115a, thereby preventing leakage of the combustion gas.

Because the burners 120 are fixed by caulking, however, if complications such as cracking in the ceramic plates forming the combustion wall occur, the burners 120 cannot be removed from the fryer 100 and replaced. Thus, it is necessary to replace the entire vat 110, which is formed in a single unit with the burners 120. Accordingly, maintenance costs are very high.

The liquid heating cooker of the present invention solves this problem, and it is an object thereof to reduce maintenance costs for the burners.

SUMMARY OF THE INVENTION

According to a first aspect of the present invention, and in order to solve the foregoing problems, a liquid heating cooker is provided, comprising:

a vat in which a heating medium is filled;

a burner for heating the heating medium within the vat by combustion so as to cook foods; and a container for containing the burner so that its combustion surface is in opposition to an outside wall surface of the vat;

wherein a guide means for sliding the burner in and out and an access portion for the burner are formed in the container, so as to make the burner removable and attachable with respect to the container.

According to a second aspect of the present invention, a liquid heating cooker according to the first aspect is provided, wherein the guide means is arranged so that the burner can be slid in the front to back direction, the access portion is arranged at a front surface of the container, and a cover for covering the access portion is provided in such a way that it can be removed from the container.

According to a third aspect of the present invention, a liquid heating cooker according to the second aspect is provided, wherein the combustion surface of the burner faces upwards and heats a bottom surface of the vat.

According to a fourth aspect of the present invention, a liquid heating cooker according to the third aspect is provided, wherein the container, by containing the burner, is partitioned into a combustion chamber formed between the combustion surface of the burner and the bottom surface of the vat and a non-combustion chamber formed between the bottom surface of the burner and the bottom surface of the container, and wherein a linking route for linking the non-combustion chamber with an air supply route of a blower for supplying combustion air to the burner is provided.

According to a fifth aspect of the present invention, a liquid heating cooker according to any of the second to fourth aspects is provided, wherein when the burner is contained in the container, a combustion chamber partitioning wall for partitioning a combustion chamber, which is formed between the combustion surface of the burner and the outside wall surface of the vat, into left and right chambers is formed in the sliding direction of the burner.

According to a sixth aspect of the present invention, a liquid heating cooker according to any of the first to fifth aspects is provided, wherein an all primary air burner is used for the burner.

With the liquid heating cooker according to the first aspect of the present invention configured as above, foods within the vat are cooked by heating the vat from the outside with the burner.

Should the burner break down, then it can be slid along the guide means and removed/inserted through the access portion of the container. As a result, it is possible to repair only the burner or to replace it with a new burner.

With the liquid heating cooker according to the second aspect of the present invention, to remove the burner, the blocking panel at the front surface of the cooker is removed and the burner is pulled out toward the cooker operator from the access portion of the container.

With the liquid heating cooker according to the third aspect of the present invention, the burner is provided below the vat, where there is available space, and thus the cooker does not become as large as when the burner is provided to the front, back, left, or right of the vat.

Additionally, the heating medium within the vat is heated from below, so that the heating medium is circulated while rising smoothly.

With the liquid heating cooker according to the fourth aspect of the present invention, the non-combustion chamber and the blower are linked via the linking route, and thus air pressure from the blower acts upon the non-combustion chamber. Accordingly, combustion gas from the burner does not flow to the non-combustion chamber, even if airtightness is not maintained between the combustion chamber and the non-combustion chamber.

With the liquid heating cooker according to the fifth aspect of the present invention, the combustion chamber partitioning wall is formed in the direction in which the burner slides, and thus when the burner is contained within the container, the combustion chamber is partitioned into left and right chambers.

With the liquid heating cooker according to the sixth aspect of the present invention, an all primary air burner is used, so that combustion is performed with primary air only and the burner can be operated at any angle, including sideways and downward orientations. Consequently, with the liquid heating cooker according to claim 6, there is a large degree of freedom as to the orientation of the combustion surface, making the arrangement of the burner easy.

Accordingly, there are few limitations as to the direction at which the burner is inserted and removed, which allows the access portion to be provided in a direction at which the burner is easily removed and also allows the burner to be arranged at a location where favorable cooking is achieved.

BRIEF DESCRIPTION OF THE DRAWINGS

FIG. 6 is a cross-sectional front view of a portion of a conventional fryer.

DETAILED DESCRIPTION OF THE INVENTION

To further clarify the configuration and the operation of the present invention as explained above, a preferred embodiment of the liquid heating cooker of the present invention is described below.

A commercial fryer is described as an embodiment of the present invention with reference to FIGS. 1 to 6.

Figure 3:
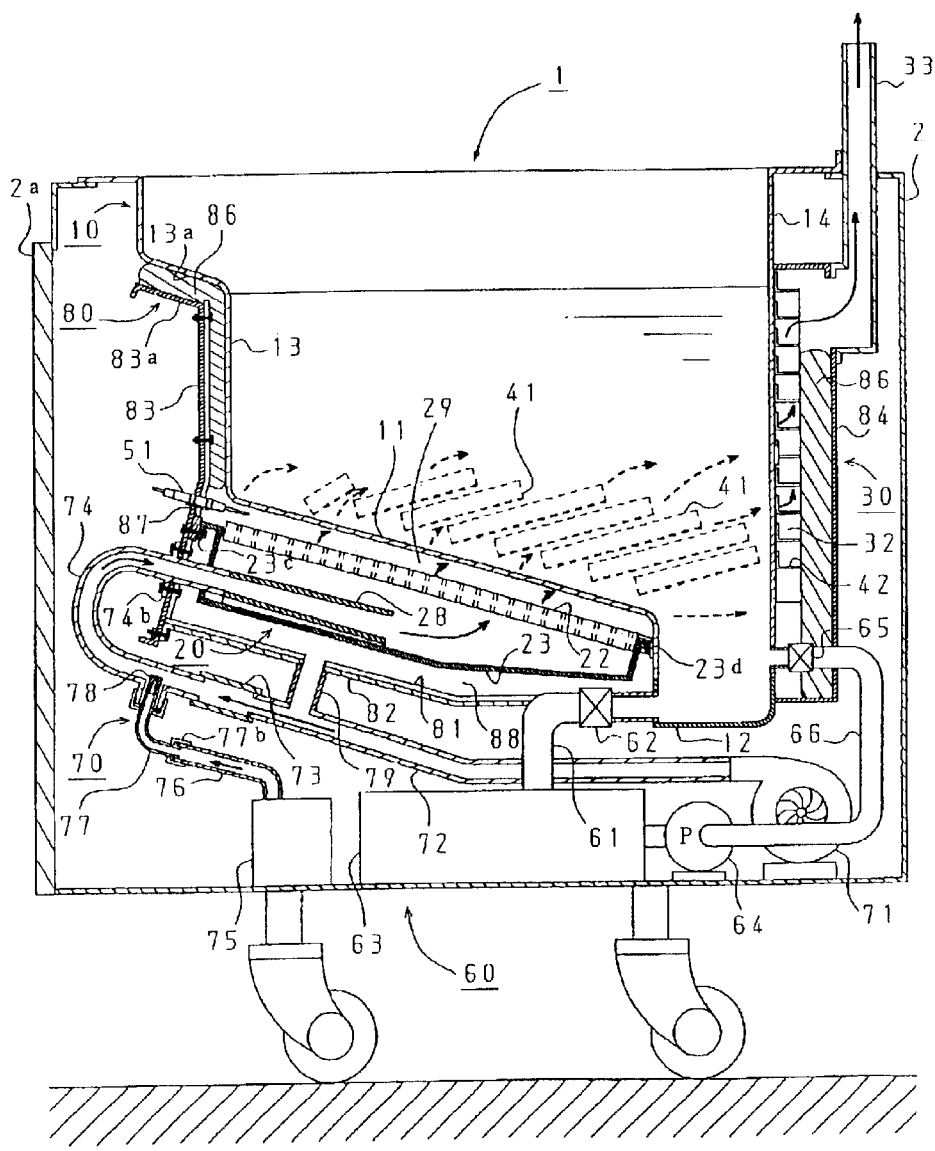
FIG. 3 is a cross-sectional side view of a liquid heating cooker (e.g., a fryer) according to one embodiment of the present invention.

As shown in FIG. 3, the fryer 1 includes a main housing 2 inside which the following components are provided: a box-shaped vat 10 into which cooking oil i.e., heating medium) is filled; a burner 20, which is provided on the outside in opposition to a later-mentioned vat bottom wall portion 11 and is for heating the cooking oil; a container 80, which is screwed to the bottom part of the vat 10, for containing and supporting the burner 20; a supply portion 70 for supplying air for combustion and combustion gas to the burner 20; an exhaust duct 30 that conveys combustion gas from the burner 20 to the outside of the fryer while the cooking oil is heated at intermediate positions thereof; a controller (not shown) for controlling cooking times and the cooking temperature; and a filtration/circulation device 60 provided below the vat 10 for filtering the cooking oil. A door 2a is provided in the front surface of the main housing 2. It should be noted that the left side in FIG. 3 corresponds to the front of the fryer 1, and is the area where the fryer operator performs the task of cooking foods.

Figure 2:
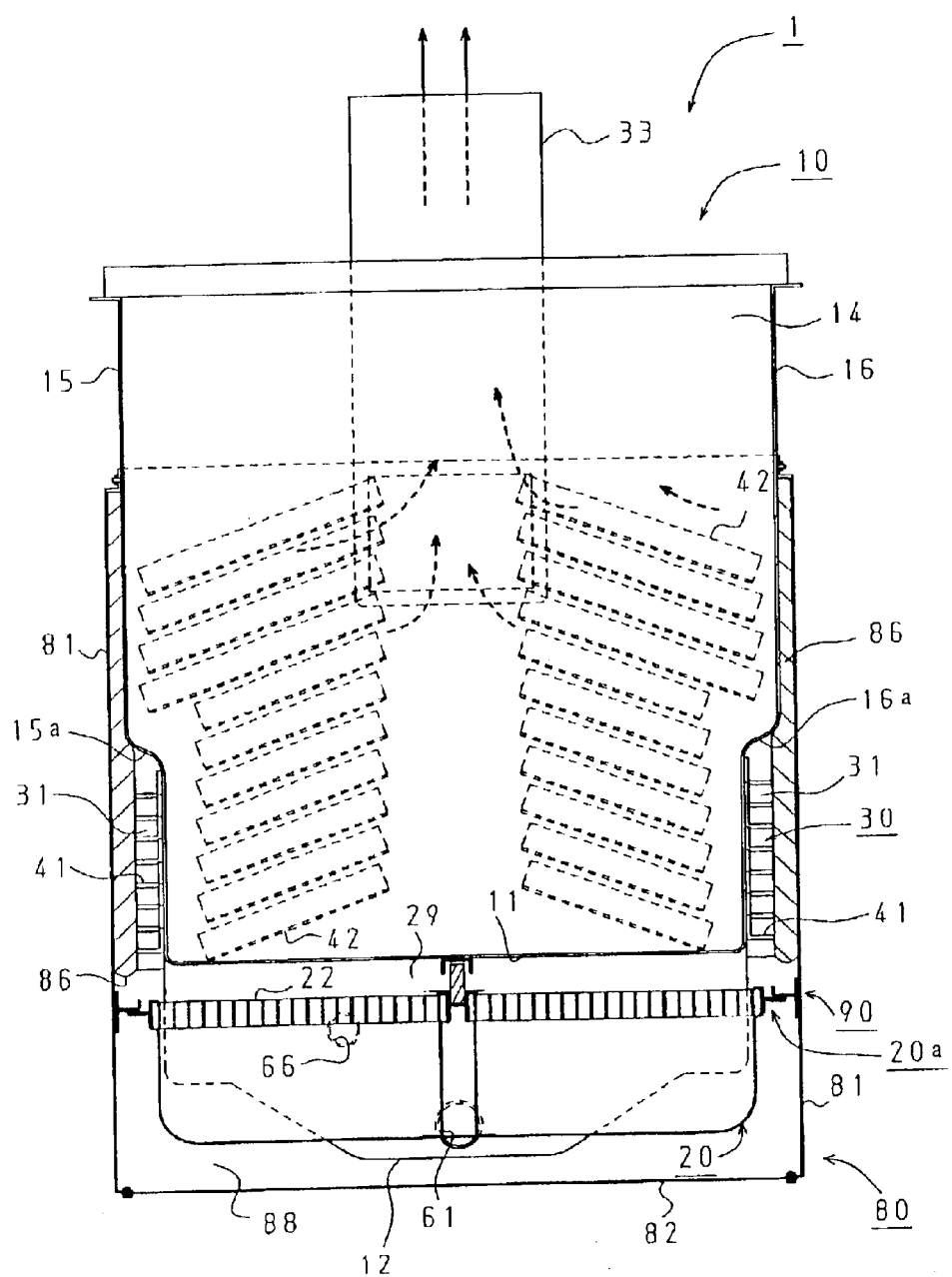
FIG. 2 is a cross-sectional front view of a liquid heating cooker (e.g., a fryer) according to one embodiment of the present invention.
Figure 4:
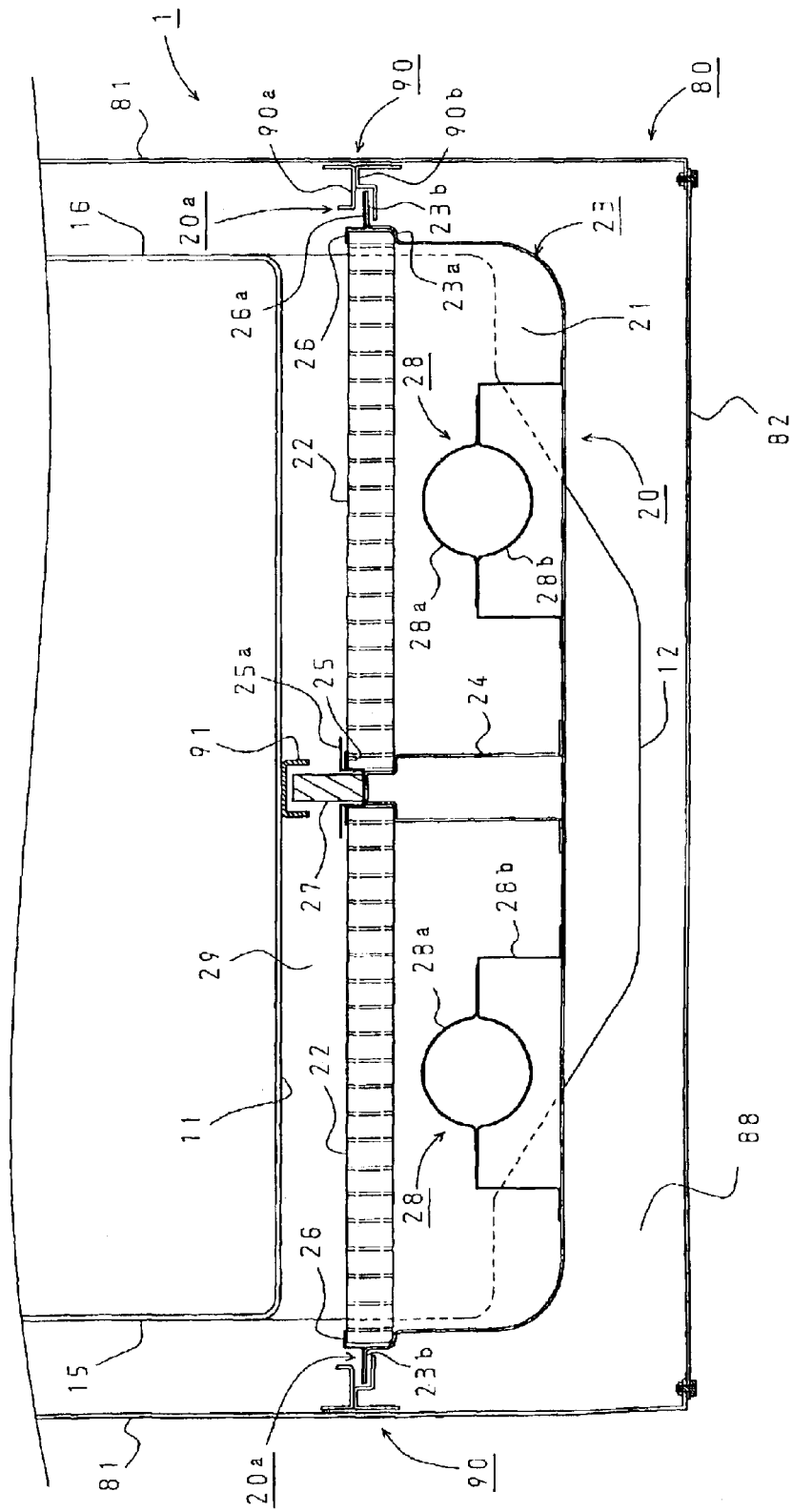
FIG. 4 is a cross-sectional front view of a burner and the surrounding components according to one embodiment of the present invention.

As shown in FIGS. 2 to 4, the wall surface of the vat 10 can be broadly divided into a bottom wall portion 11, an oil sediment holding portion 12, a front wall portion 13, a rear wall portion 14, a left side wall portion 15, and a right side wall portion 16.

The left side wall portion 15 and the right side wall portion 16 of the vat 10 each have a step portion 15a and 16a, respectively, that form the exhaust duct 30. The front wall portion 13 has a front sloped portion 13a that slopes downward toward the rear.

The bottom wall portion 11 of the vat 10 is a flat surface that slopes downward to the rear of the vat from the bottom end of the front wall portion 13, and the oil sediment holding portion 12 for holding oil sediment is formed at the rear end of the bottom wall portion 11 between the bottom wall portion 11 and the rear wall portion 14. The oil sediment holding portion 12 is formed in a groove shape extending sideways.

As shown in FIG. 3, the burner 20 is an all primary air burner with a ceramic plate 22 provided as the combustion surface, in which a plurality of burner ports are formed. The combustion surface of the burner 20 is provided opposing the outer surface of the bottom wall portion 11 of the vat 10 at a predetermined spacing from the bottom wall portion 11, forming a combustion chamber 29 therebetween. An ignition electrode 51 is provided in the combustion chamber 29 and overlooks the ceramic plate 22. Although explained in greater detail later, the burner 20 is provided so that it can be removed from and attached to the container 80.

FIG. 4 is a front view in which the components of the burner 20 are shown in detail.

The burner 20 includes a flat, box-shaped burner unit 23 with open upper surfaces and ceramic plates 22 that cover the upper surface of the burner unit 23. Also, a mixing chamber 21 for mixing the combustion gas and the air for combustion is formed between the burner unit 23 and the ceramic plates 22.

The burner unit 23 has a step portion 23a, in which the entire circumference of the top end of the step portion 23a is bent to the outside. Further, the top ends of the step portion 23a are bent to the outside and form left and right end portions 23b, a front end portion 23c, and a rear end portion 23d (FIG. 3).

The left and right end portions 23b extend in the front to back direction on a horizontal plane and are welded to the bottom end surface 26a of left and right outside pressing panels 26, which are described later, to form brim portions 20a, as shown in FIG. 4.

Figure 5:
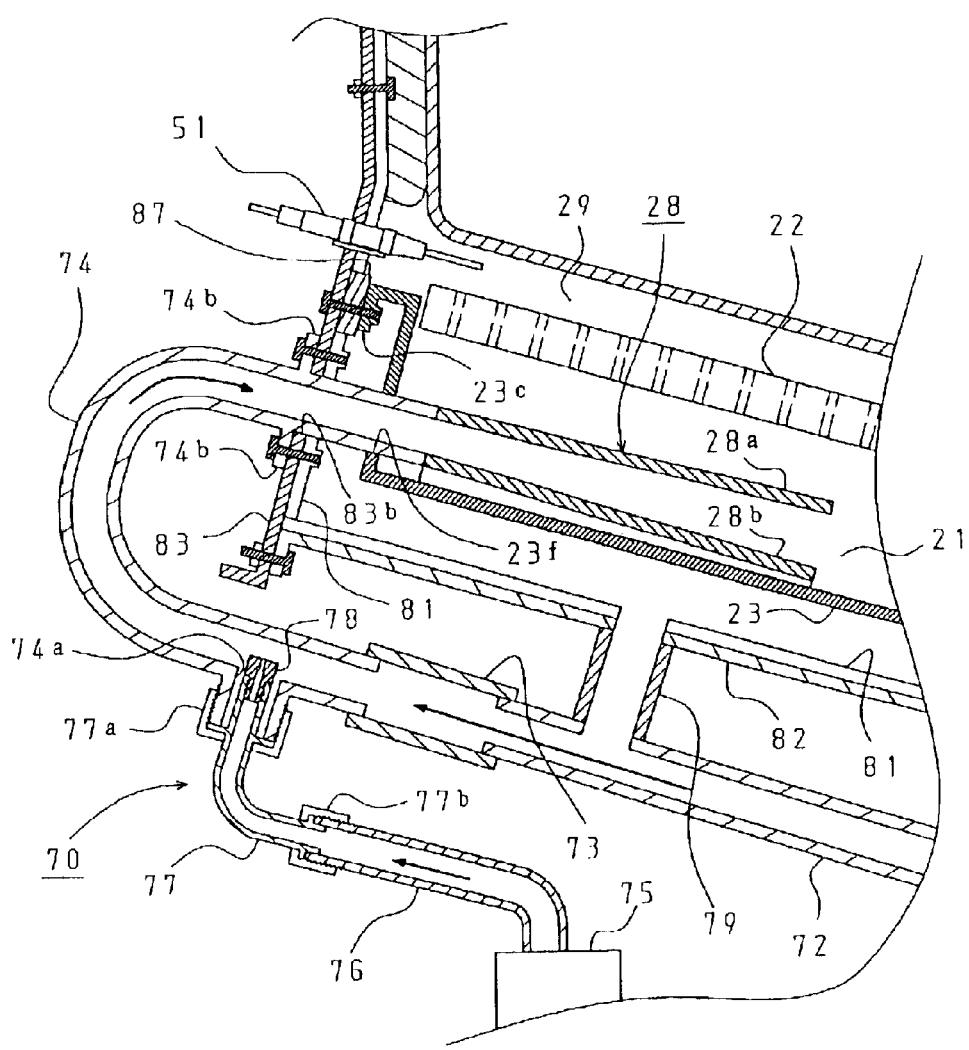
FIG. 5 is a cross-sectional side view of a portion of a liquid heating cooker (e.g., a fryer) according to one embodiment of the present invention.

The front end portion 23c and the rear end portion 23d each bend downward and form attachment surfaces, as shown in FIGS. 3 and 5. Grooves 23e (FIG. 1) are formed in the left and right ends of the attachment surface of the rear end portions 23d, and the rear end portion 23d is arranged so that the left and right end portions 23b do not come into contact with a later-described rail 90.

Figure 1:
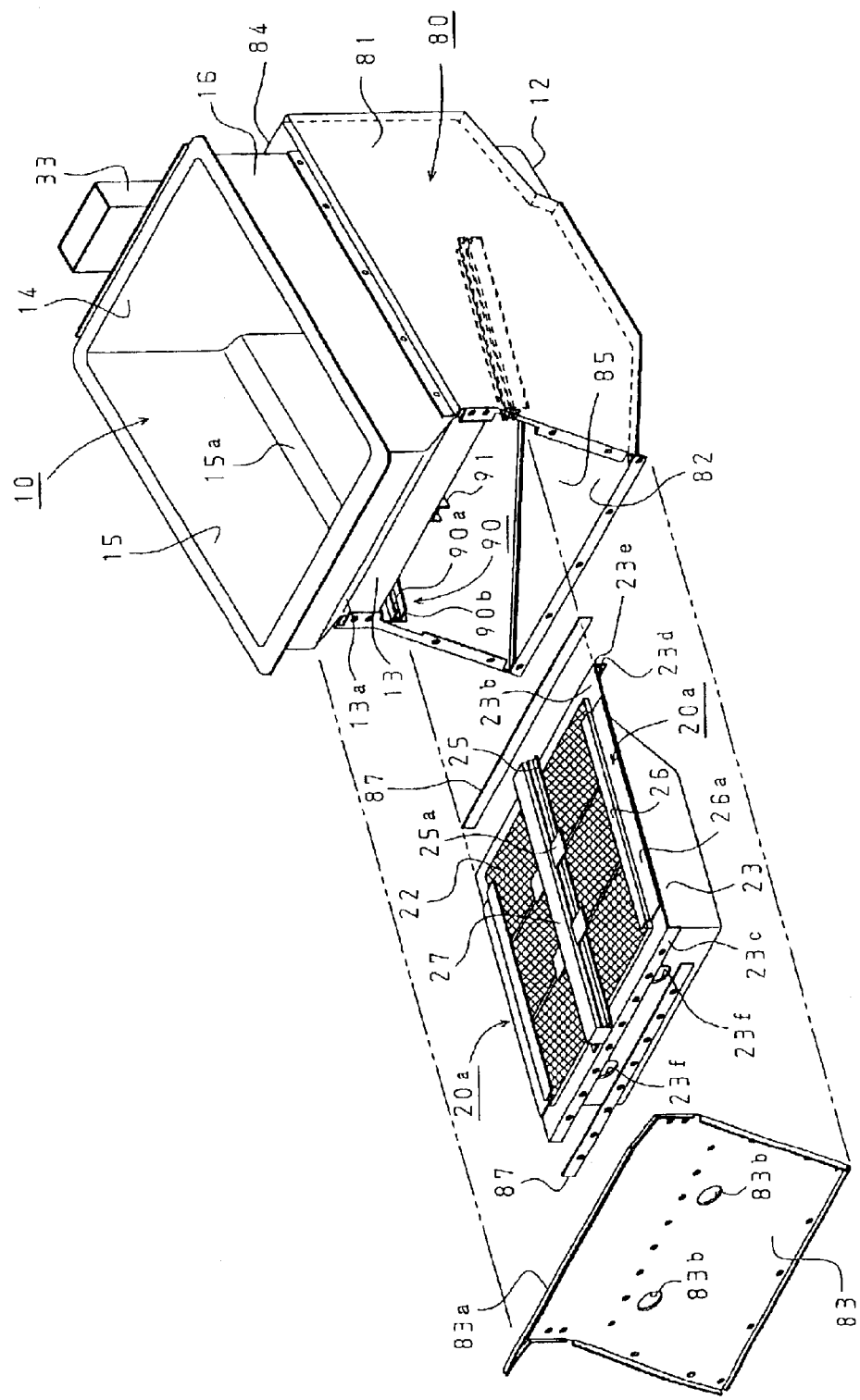
FIG. 1 is a perspective view of a portion of a liquid heating cooker (e.g., a fryer) according to one embodiment of the present invention.

Additionally, as shown in FIG. 1, packing members 87 for preventing combustion exhaust leaks are provided to the front and the rear of the burner 20.

As shown in FIG. 4, a mixing chamber partitioning panel 24 for partitioning the mixing chamber 21 into left and right chambers are welded to the middle of the bottom surface of the burner units 23. The ceramic plates 22 are divided in lengthwise and sideways directions into six plates, and mounted between the mixing chamber partitioning panel 24 to the middle and the step portion 23a to the outside on the left and right.

The left and right ends of the ceramic plates 22 are held down from above by an inside pressing panel 25, which is mounted on the mixing chamber partitioning panels 24 and include a groove portion in their center, and the outside pressing panels 26, which are welded to the left and right end portions 23b of the burner unit 23.

A flame transfer panel 25a for transferring flames between the ceramic plates 22, which are separated in the depth direction, is formed in the top portion of the inside pressing panels 25.

A combustion chamber partitioning rod (combustion chamber partitioning wall) 27, which is made of ceramic wool and is for partitioning the combustion chamber 29 into left and right chambers when the burner 20 is contained, is inserted into the center groove portion of the inside pressing panels 25 from above.

Throats 28 made of a throat upper panel 28a and a throat lower panel 28b, extending from the front surface of the burner unit 23 toward the center of the mixing chambers 21, are provided inside the burner unit 23. The throats 28 convey the combustion gas and the air for combustion to the middle of the burner 20 while mixing the gas and air.

A center guide panel 91, which has a bracket-shaped cross section and is for guiding the combustion partitioning rod 27 and partitioning the combustion chamber 29 when the burner 20 is contained, is provided extending in the depth direction in the center of the bottom wall portion 11 of the vat 10.

The container 80 is for fixing the burner 20 in a predetermined position. It is made of side panels 81 that oppose the side wall portions 15 and 16 of the vat 10 with a predetermined spacing between them, a lower panel 82 that is fixed to the bottom end of the side panels 81, a front panel 83 (cover) that is fixed to the side panels 81 and the lower panel 82, and covers the access portion 85 (FIG. 1) for the burner 20 that is formed in a front portion between the side panels 81 and the lower panel 82, and a rear panel 84 that is fixed to the rear wall portion 14 of the vat 10 and bent at its top and bottom into the shape of a bracket.

The container 80 is formed hermetically by fixing its component panels 81 to 84 with nuts and bolts. The upper ends of the side panels 81 are fixed to the side wall portions 15 and 16 above the step portions 15a and 16a.

An upper portion 83a of the front panel 83 is formed at a predetermined spacing from the front sloped portion 13a of the vat 10 and extends further upward than the side panels 81, as shown in FIG. 3.

Furthermore, the lower panel 82 is provided with a linking route 79 that is linked to a later-described air duct 72.

As shown in FIG. 4, rails 90 (guide means) that extend in the depth direction on the inside of the side panels 81 and are for sliding the burner 20 back and forth are formed vertically on the side panels 81. Lower rails 90b support the brim portions 20a, and upper rails 90a limit upward movement so that the burner 20 does not come into contact with the bottom wall portion 11 of the vat 10.

The burner 20 is guided by the rails 90 and contained in the container 80.

At this time, the container 80 is partitioned vertically by the burner 20 and the rails 90. Also, the combustion chamber 29 is formed between the combustion surface of the ceramic plates 22 and the outer surface of the bottom wall portion 11 of the vat 10, and a lower chamber 88 (non-combustion chamber) is formed between the outer bottom surface of the burner unit 23 and the inner surface of the lower panel 82 of the container 80.

In addition, the combustion chamber 29 is partitioned into left and right chambers by the combustion chamber partitioning rod 27 when the burner 20 is contained.

The supply portion 70, as shown in FIGS. 3 and 5, is provided with a fan 71, the air duct 72 (air supply route), a tube 73, and a mixture supply duct 74 having a gas inlet 74a, in that order from its upstream side, to serve as a route for supplying air for combustion to the burner 20. The supply portion 70 is also provided with a gas control portion 75 for controlling the supply and the stopping of the fuel gas, a gas duct 76, and a connection duct 77 provided with a gas nozzle 78 at its front end, in that order from its upstream side, to serve as a route for supplying fuel gas to the burner 20.

It should be noted that the air duct 72 is branched upstream of the linking route 79 to supply fuel gas into each divided mixing chamber 21 from the burner 20. Also, the supply portion 70 further downstream than the linking route 79 is provided as two parallel systems.

The connection duct 77 is connected to the gas inlet 74a of the mixture supply duct 74 via an upper coupler 77a and is connected to the gas duct 76 via a lower coupler 77b.

Also, the mixture supply duct 74 is brought into contact with the throat 28 of the burner 20 so as to form a single unit with the slot 28 that serves as a mixture flow route. The mixture supply duct 74 is screwed to the burner unit 23 at its flange portion 74b.

The exhaust duct 30 is for conveying combustion gas from the burner 20 to the outside of the fryer. As shown in FIGS. 2 and 3, the exhaust duct 30 is made of left and right ducts 31, which are linked to the combustion chamber 29 provided below the front part of the vat 10 and are provided to the left and right outside of the vat 10, a rear duct 32 which is linked to the left and right ducts 31 and provided behind the vat 10, and a vertically extending exhaust flue 33 which is linked to the rear duct 32 and is open at its upper end.

The left and right ducts 31 are formed by the space enclosed by the outer surfaces of the side panels 81, the rear panel 84, and the outer surfaces of the lower side wall portions 15 and 16 of the vat 10, as shown in FIG. 2.

On the other hand, the rear duct 32 is formed by the space enclosed by the outer surface of the rear wall portion 14 of the vat 10 and the inner surface of the rear panel 84, as shown in FIG. 3.

Side fins 41 are provided in the left and right ducts 31 and are welded to the side wall portions 15 and 16 of the vat 10 sloping upward to the rear. Rear fins 42 are provided in the rear duct 32 and are welded to the left and right sides of the rear wall portion 14 of the vat 10 in rows parallel to one another and sloping upward toward the center. The fins 41 and 42 are provided with L-shaped profiles, promoting the exchange of heat between the combustion gas and the cooking oil. It should be noted that fins having a bracket-shaped cross section can be included among the fins.

Insulating material 86 is provided around the entire perimeter of the vat 10 between the container 80 and the vat 10.

The filtration/circulation device 60 includes an inlet pipe 61 for discharging oil from the center bottom portion of the front wall of the oil sediment holding portion 12, a filter device 63 that is provided with a filter (not shown) and is for filtering the cooking oil that is discharged from the inlet pipe 61, and a pump 64 for returning the filtered cooking oil to the vat 10 via an outlet pipe 66. The inlet pipe 61 and the outlet pipe 66 are provided with valves 62 and 65, respectively.

In the fryer 1 of the above-described configuration, once cooking oil has been filled into the vat 10, the burner 20 is ignited and high temperature combustion gas is delivered from the combustion chamber 29 to the left and right ducts 31 and the rear duct 32. Accordingly, the cooking oil is heated by heat exchange via the bottom wall portion 11, the side wall portions 15 and 16, and the rear wall portion 14 of the vat 10, after which the combustion gas is discharged from the exhaust flue 33.

The combustion exhaust inside the combustion chamber 29 does not leak into the lower chamber 88 at this time, because the air duct 72 and the lower chamber 88 are linked via the linking route 79, and thus there is air pressure on the lower chamber 88 from the fan 71.

Consequently, despite the fact that within the container 80 the combustion chamber 29 is separated from the lower chamber 88 via only the burner 20 (that is, the burner unit 23 and the brim portions 20a) and the rails 90, a lower degree of airtightness in the lower portion of the combustion chamber 29 is not problematic. As a result, the rails 90 do not require airtightness, so that they can be configured simply, and manufacturing costs can be kept down.

When the burner 20 must be repaired after long term use of the fryer 1, the door 2a on the front of the main housing 2 is firstly opened.

Then, the lower coupler 77b of the supply portion 70 is loosened and the screws in the flange portion 74b of the mixture supply duct 74 are removed, and the mixture supply duct 74 that has become a single unit with the connection duct 77 is removed from the gas duct 76, the tube 73 that is provided at the end of the air duct 72, the front panel 83, and the burner unit 23. The front panel 83 is then removed from the container 80.

Next, as shown in FIGS. 1 and 2, the brim portion 20a of the burner 20 glides on the lower rail 90b and the burner 20 is removed obliquely upward (on a substantially horizontal plane) from the access portion 85 (open portion) in the front surface of the container 80. Then, repairs such as replacing the ceramic plate 22 are performed.

With the above-described fryer according to this embodiment, the burner 20 can be easily removed from the fryer 1 by simply removing the screws and nuts on the front surface of the container 80, taking out the mixture supply duct 74 and the front panel 83, and sliding the burner 20 forward.

Consequently, it is not necessary to replace the entire vat 10 with a new vat when the burner 20 is broken, and thus maintenance costs for the burner 20 can be reduced.

Moreover, it is not necessary to remove the lower panel 82 of the container 80, so that the task of loosening the nuts from below is obviated and the burner 20 can be removed with ease.

This effort to realize the easy removal of the burner 20 is accompanied by a drop in the airtightness between the combustion chamber 29 and the lower chamber 88, which are separated vertically by the burner 20. However, because the linking route 79 has been provided, the combustion gas from the burner 20 does not flow to the lower chamber 88. Consequently, heat can be favorably exchanged between the combustion gas and the cooking oil of the vat 10, which raises the thermal efficiency and is economical.

Also, because the burner 20 slides substantially horizontally along the rails 90, the burner 20 can be inserted and removed with less effort than a type of fryer in which the burner is raised directly upward. Moreover, due to the rails 90, the positional relationship in the width direction between the burner 20 and the vat 10 is exact. Consequently, the vat 10 can be heated and foods can be cooked at appropriate locations.

Also, the burner 20 is an all primary air burner, which has few limitations as to the orientation of its combustion surface. As a result, the burner 20 is easily inserted and removed, and can be arranged in a position and/or orientation where favorable cooking performance can be maintained.

In general, very little space can be secured around the fryer 1 in a kitchen in a fast food restaurant, for example. With the fryer 1, however, the burner 20 has been provided at the bottom wall of the vat 10, allowing the fryer to be made compact.

Also, space for removing the burner does not have to be newly created, because the burner 20 is removed from the front of the fryer where the fryer operator performs the task of cooking foods. Consequently, there is a large degree of freedom as to where the fryer can be placed. Moreover, the cooking oil is heated from below the vat 10, and thus convection thereof is smooth and foods can be cooked uniformly.

A sufficient heating area can be secured in the exhaust duct 30 that encloses the perimeter of the vat 10, so that the cooking oil can be sufficiently heated even if a burner 20 is provided in only one location. Consequently, a plurality of burners is not required, which makes it possible to keep manufacturing costs down.

Furthermore, because the left and right ducts 31 are formed below the step portions 15a and 16a of the left and right side wall portions 15 and 16 of the vat 10, they do not bulge from the side of the top portion of the vat 10, and thus the fryer is compact.

Combustion gas from the burner 20 passes from the combustion chamber 29 through the exhaust duct 30, and thus surrounds the entire perimeter of the bottom part of the vat 10. As a result, a large area is heated by the combustion gas, which raises the heating efficiency and saves energy.

The L-shaped side fins 41 and the rear fins 42 are provided at the side wall portions 15 and 16 and the rear wall portion 14 in a sloping manner. Consequently, the rising high temperature combustion gas is conveyed to the rear duct 32 and is reliably brought into contact with the entire heat receiving surface of the fins 41 and 42. As a result, the exchange of heat between the combustion gas and the cooking oil is greatly promoted and is efficient.

In the foregoing, one embodiment of the present invention was described, but the present invention is in no way limited to this particular embodiment, and may of course be embodied in various other forms within a scope that does not depart from the gist of the present invention.

For example, the present invention can be applied to a noodle boiler in place of a fryer, as long as it is an apparatus that cooks foods using a liquid as the heating medium.

Also, a Bunsen burner can be employed as the burner in place of the fully aerated burner. There are no particular limitations as to the placement of the all primary air burner as long as it is located outside the vat.

Also, the location where the burner is inserted and removed is not limited to the front wall of the container, and can also be the left or right side wall, the rear wall, or the bottom wall.

The combustion surface of the burner can also be provided vertically. For example, the burner can be provided in front of the vat and slid to the left and right in the width direction of the vat. Alternatively, the burner can be provided to the left and right outside of the vat and removed from the front.

Furthermore, as the guide means, protruding portions can be formed on the bottom surface of the container and recessed portions that engage those protruding portions can be formed in the burner.

The fryer 1 according to the present embodiment is a full-vat type fryer in which the vat has not been partitioned, but the present invention can also be applied to a split-vat type fryer in which the vat is partitioned into left and right vats. In the fryer 1, the combustion chamber 29 is partitioned into left and right chambers by the combustion chamber partitioning rod 27 and the mixing chamber 21 is partitioned into left and right chambers by the mixing chamber partitioning panel 24. Consequently, simply by providing a gas control portion 75 that can control the supply of gas to the left and right separately, the present invention can be easily applied to a split vat type fryer, making it possible to cook foods using only one of the vats.

Therefore, the burner can be employed in both full-vat and split-vat type fryers, and thus manufacturing costs are inexpensive. Moreover, a split vat type fryer does not necessarily require the provision of two burners.

As described in detail above, according to the liquid heating cooker of the first aspect of the present invention, the burner can be removed from the container and slides along the guide means. Consequently, if complications arise in the burner, the entire vat or components surrounding the burner do not have to be replaced, as it is easy to remove only the burner by sliding it out through the access portion of the container and then repair or replace it. Hence, costs for repairs can be reduced.

Moreover, the vat can be heated and foods can he cooked while maintaining an exact positional relationship of the burner to the vat with the guide means.

Furthermore, according to the second aspect of the present invention, the burner slides out and is removed from the front area of the cooker, which is the space where cooker operators carry out the task of cooking foods, and thus it is not necessary to create additional space expressly for removing the burner. Consequently, the liquid heating cooker has few limitations as to where it can be placed.

Additionally, the cover is removably fixed to the front surface of the cooker and thus can be removed easily. Accordingly, the burner can be removed in a short time.

Further, according to the third aspect of the present invention, the burner is provided under the vat, so that the cooker can be made more compact than if the burner was provided to the front, back, left, or right of the vat.

Additionally, because the heating medium in the vat is heated from below, the heating medium is circulated smoothly, and foods can be cooked without cooking irregularities.

Further, according to the fourth aspect of the present invention, air pressure from the blower is applied to the non-combustion chamber via the linking route. Consequently, the combustion gas from the burner does not flow into the non-combustion chamber, and thus heat can be favorably exchanged between the combustion gas and the heating medium of the vat. Accordingly, the thermal efficiency is increased, which is economical.

Additionally, it is not necessary that the guide means is hermetic.

Further, according to the fifth aspect of the present invention, simply by positioning the burner within the container, the combustion chamber can be easily partitioned by the combustion chamber partitioning wall.

As a result, it is not necessary to provide separate left and right burners, even in the case of a split-vat type fryer in which the vat is partitioned into left and right vats, and the manufacturing costs for the burner can be kept down. Moreover, in the liquid heating cooker according to the fifth aspect of the present invention, the combustion chamber can be partitioned simply by sliding a single burner.

Further, according to the sixth aspect of the present invention, an all primary air burner, which has few limitations with regard the orientation of its combustion surface, is used, and thus by mounting the burner in a preferred orientation, the burner is easily inserted and removed. Also, food can be cooked favorably.

What is claimed is:

1. A liquid heating cooker, comprising:
   a container having an access portion provided on a portion of a front wall thereof, said access portion being covered by a removable cover that defines at least a portion of said front wall of said container;
   a vat containing a heating medium positioned within a portion of said container;
   a combustion burner for heating said heating medium in said vat, said combustion burner being positioned within a portion of said container such that a combustion surface of said combustion burner opposes an outer surface of a bottom wall of said vat; and
   guide means for sliding said combustion burner in and out of said container via said access portion in a substantially horizontal direction such that said combustion burner is removable and attachable with respect to said container;
   wherein, when said combustion burner is positioned within said container, said container comprises a partitioned chamber including a combustion chamber defined at least by said combustion surface of said combustion burner and said outer surface of said bottom wall of said vat, and a non-combustion chamber defined by a bottom surface of said combustion burner and an inner surface of a bottom wall of said container; and
   wherein a linking route links said non-combustion chamber with an air supply route of a blower supplying combustion air to said combustion burner.

2. The liquid heating cooker according to claim 1, wherein said combustion burner is an all primary air burner.

3. The liquid heating cooker of claim 1, wherein at least a portion of said combustion burner defines a partitioning wall partitioning said combustion chamber into a left and a right chamber with respect to the sliding direction of said combustion burner.

4. The liquid heating cooker according to claim 3, wherein said combustion burner is an all primary air burner.

5. A liquid heating cooker, comprising:

a container having an access portion provided on a portion of a front wall thereof, said access portion being covered by a removable cover that defines at least a portion of said front wall of said container;

a vat containing a heating medium positioned within a portion of said container;

a combustion burner for heating said heating medium in said vat, said combustion burner being positioned within a portion of said container such that a combustion surface of said combustion burner opposes an outer surface of a wall of said vat; and guide means for sliding said combustion burner in and out of said container via said access portion in a substantially horizontal direction such that said combustion burner is removable and attachable with respect to said container;

wherein a combustion chamber is defined at least by said combustion surface of said combustion burner and an outer surface of said wall of said vat and wherein at least a portion of said combustion burner defines a partitioning wall partitioning said combustion chamber into a left chamber and a right chamber with respect to the sliding direction of said combustion burner.

6. The liquid heating cooker according to claim 5, wherein said combustion burner is an all primary air burner.

7. A liquid heating cooker, comprising:

a container having an access portion provided on a portion of a front wall thereof, said access portion being covered by a removable cover that defines at least a portion of said front wall of said container;

a vat containing a heating medium positioned within a portion of said container;

a combustion burner for heating said heating medium in said vat, said combustion burner being positioned within a portion of said container such that a combustion surface of said combustion burner opposes an outer surface of a bottom wall of said vat; and guide means for sliding said combustion burner in and out of said container via said access portion in a substantially horizontal direction such that said combustion burner is removable and attachable with respect to said container;

wherein, when said combustion burner is positioned within said container, said container comprises a combustion chamber defined at least by said combustion surface of said combustion burner and said outer surface of said bottom wall of said vat; and wherein at least a portion of said combustion burner defines a partitioning wall partitioning said combustion chamber into a left chamber and a right chamber with respect to the sliding direction of said combustion burner.

8. The liquid heating cooker according to claim 7, wherein said combustion burner is an all primary air burner.

* * * * *